United States Patent [19]

Silverman et al.

[11] Patent Number: 5,130,815
[45] Date of Patent: Jul. 14, 1992

[54] METHOD AND APPARATUS FOR ENCODING A VIDEO SIGNAL HAVING MULTI-LANGUAGE CAPABILITIES

[75] Inventors: Murray B. Silverman; Mert Van Pelt, both of Los Angeles, Calif.

[73] Assignee: MTI Associates, Los Angeles, Calif.

[21] Appl. No.: 555,916

[22] Filed: Jul. 20, 1990

[51] Int. Cl.$^5$ ............................................. H04N 5/76
[52] U.S. Cl. ................... 358/335; 358/341; 358/343
[58] Field of Search ............... 358/142, 143, 144, 145, 358/146, 147, 335, 310, 343, 341, 342; 360/19.1

[56] References Cited

U.S. PATENT DOCUMENTS

| | | | |
|---|---|---|---|
| 4,786,967 | 11/1988 | Smith, III et al. | 358/343 |
| 4,847,698 | 7/1989 | Freeman | 358/143 |
| 4,855,827 | 8/1989 | Best | 358/142 |
| 4,864,423 | 9/1989 | Nagai et al. | 358/322 |

FOREIGN PATENT DOCUMENTS 55-63188  5/1980  Japan ................................. 358/142

OTHER PUBLICATIONS

Gassman, "Twelve Sound Channels During the Vertical Sync Interval of the Television Signal", Jul. 6, 1970, 7 pages.

*Primary Examiner*—Roy N. Envall, Jr.
*Assistant Examiner*—Thai Tran
*Attorney, Agent, or Firm*—Blakely, Sokoloff, Taylor & Zafman

[57] ABSTRACT

An audio/video system for encoding and decoding a video signal and a plurality of corresponding audio signals. The system includes an encoder means for receiving an input video signal, a first audio signal, and a plurality of second audio signals which correspond to the input video signal. The encoder means combines the input video signal and the plurality of second audio signals to produce an encoded video signal but leaves the first audio signal substantially unchanged and then outputs the first audio signal and the encoded video signal. An audio/video signal communication means is connected to the encoder. The audio/video signal communication means accepts the encoded video signal and the first audio signal and transmits them to a decoder. The decoder means separates the plurality of second audio signals from the encoded video signal leaving an unencoded video signal. The decoder then combines each of the plurality of second audio signals with a reproduction of the first audio signal so as to form a plurality of combined audio signals. The decoder then outputs the unencoded video signal and the plurality of combined audio signals. A signal delivery means which is coupled to the decoder includes a selection means which allows at least one of the plurality of the combined audio signals to be played with the unencoded video signal in a manner determined by the user.

27 Claims, 4 Drawing Sheets

METHOD AND APPARATUS FOR ENCODING A VIDEO SIGNAL HAVING MULTI-LANGUAGE CAPABILITIES

FIELD OF THE INVENTION

The present invention relates to the field of video signals and more particularly to a method and apparatus for encoding and decoding a video signal having multi-language capabilities.

BACKGROUND OF THE INVENTION

In places where multiple languages are spoken, there is a need to provide movies, prerecorded television programs, educational videos as well as many other forms of video/audio programming in multiple languages to accommodate the multi-lingual viewing audience. Most often it desired to have the capability to play back the multiple languages simultaneously with a single video signal. One technique used to achieve this result is to use different viewing channels for the different channels. A separate prerecorded video tape is generated for each language. Each tape contains the same video information but necessarily has a different audio signal for each desired language. The tapes are individually played and broadcasted on different channels. The viewer selects the channel according to the language he wishes to hear. This method is quite obviously inefficient as it requires a number of video playback means and available television channels or frequencies equal to the number of languages in question.

Briggs, U.S. patent application Ser. No. 07/411,214 entitled Multi-Language Recording and Reproducing System describes a multiple language system wherein a plurality of audio tracks, each representing a different language, are encoded into the video signal using frequency modulation techniques. However, that method is disadvantageous because it employs analog techniques which compromise video quality and produce an encoded signal incompatible or marginally compatible with several classes of important communications channels.

SUMMARY OF THE INVENTION

It is therefore an object of the present invention to provide a video system in which multiple languages can be encoded within the bandwidth of a standard video signal.

It is another object of the present invention to provide a multiple language system that can operate in conjunction with existing videotape formats and existing videotape players without modification of either the format or the player.

It is another object of the present invention to provide a multiple language broadcast system which provides a selectable multi-lingual capability without modification of the bandwidth of the broadcast signal.

It is further an object of the present invention to provide a mulitple language broadcast system which provides selectable multi-lingual capability with little or no degradation in video quality or sound quality.

An audio/video system for encoding and decoding a video signal and a plurality of corresponding audio signals is disclosed. The system includes an encoder means for receiving an input video signal, a first audio signal, and a plurality of second audio signals which correspond to the input video signal. The encoder means combines the input video signal and the plurality of second audio signals to produce an encoded video signal but leaves the first audio signal substantially unchanged and then outputs the first audio signal and the encoded video signal. An audio/video signal communication means is connected to the encoder. The audio/video signal communication means accepts the encoded video signal and the first audio signal and transmits them to a decoder. The decoder is coupled to the signal communication means and accepts the encoded video signal and the first audio signal. The decoder means then separates the plurality of second audio signals from the encoded video signal leaving an unencoded video signal. The decoder then combines each of the plurality of second audio signals with a reproduction of the firt audio signal so as to form a plurality of combined audio signals. The decoder then outputs the unencoded video signal and the plurality of combined audio signals. A signal delivery means which is coupled to the decoder includes a selection means. Selection means allows at least one of the plurality of the combined audio signals to be played with the unencoded video signal in a manner determined by the user.

DETAILED DESCRIPTION OF THE INVENTION

Figure 1:
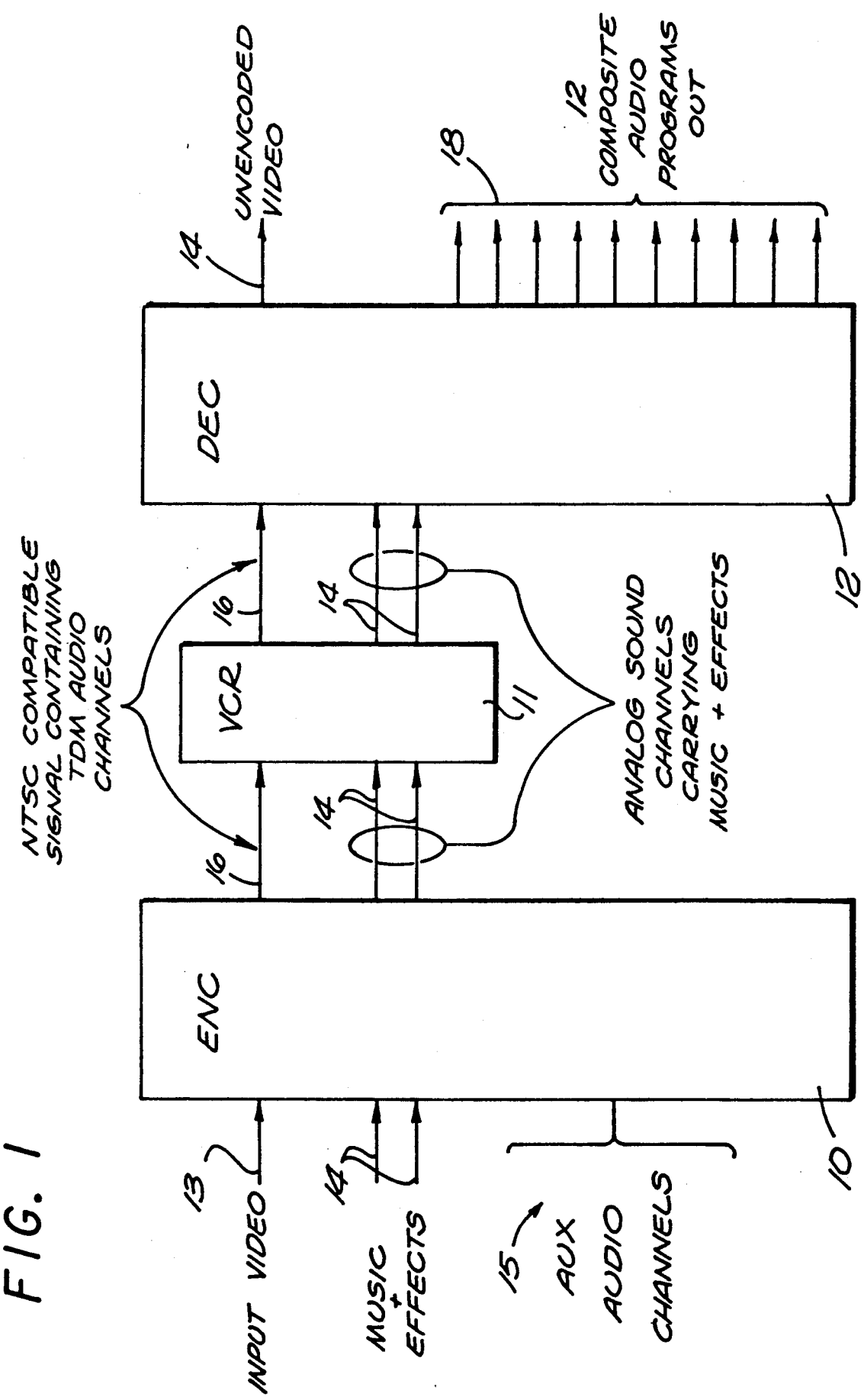
FIG. 1 is a block diagram of the components of the present system, showing their respective input/output signals.

An audio/video system with multi-language capability for encoding a video signal is described. In the following description, numerous details such as sampling rates and signal levels are set forth in order to provide a better understanding of the present invention. It will be apparent to those skilled in the art that the invention may be practiced without these specific details. In other instances, well known components such as the phase locked loop circuit are shown in block form so as not to obscure the present invention unnecessarily.

In order to better understand the operation of the present invention, it is helpful to briefly describe the manner in which a video signal is reproduced on a video monitor. The composition of the video signal is governed by industry standards—e.g., those established by the National Television System Committee. ("NTSC"). Under the NTSC standard, the video screen is divided up into 262½ separate horizontal lines of picture elements. The electron beam which is used to actually generate the picture by exciting the picture elements which causes the picture elements to be illuminated at a predetermined intensity scans the lines in a left to right, top to bottom fashion. As the electron beam moves across the video screen it is modulated in intensity so as to modulate the intensity of the picture elements and produce the video picture that is visible to the user.

Timing pulses are embedded within the NTSC video signal to control the operation of the electron beam.

This is best explained by an example. Assume that the electron beam is horizontally scanning across one of the 525 lines on the video monitor. Just as the beam reaches the right edge of the screen, a timing pulse in the video signal will indicate to the beam that it is to stop scanning. This timing pulse is known as a "horizontal retrace" pulse. The beam will briefly turn off and execute a horizontal retrace function. During this function, the electron beam will drop down to the next lower scan line and return to the left side of the video screen. After the horizontal retrace, the beam will turn back on and re-commence scanning. This process repeats until all 262½ lines of the video screen have been scanned by the electron beam. When the complete screen has been scanned, a "vertical retrace" timing pulse is inserted into the video signal. The electron beam is again briefly turned off and executes a vertical retrace function, when it returns to the beginning point at the top scan line of the video screen. In this manner, the entire screen is continuously updated so as to form the entire video picture.

This discussion is not intended as a complete description of the operation of the video monitor. Instead, it is included only to the extent that it assists in the understanding of the structure and operation of the present invention. Also, the present invention is not limited to use with the NTSC standard for the composition of video signals. It will be apparent to those skilled in the art that the techniques of the present invention may be adapted for use with any sequential video format. These may include the formats which are known in the art as PAL, SECAM, BMAC and the like. In any event, the video monitor is not an element of the present invention. The invention consists of the system for encoding a video signal as described.

Referring first to FIG. 1, a block diagram of the preferred embodiment of the major components of the present invention and their corresponding input and output signals is shown. The system includes an encoder element 10 which accepts a standard NTSC compatible signal. Any NTSC compatible signal has two components—the video portion and the audio portion. The encoder element 10 therefore accepts an input video signal 13, as well as a first audio signal which is termed herein the as the "music and effects" signal 14. The standard NTSC signal provides two dedicated, high bandwidth, channels for audio information. These two channels typically correspond to the left and right stereo channels of the complete audio signal. The stereo channels are usually timed to be in synchronization with the video portion of the NTSC signal. In this description, these two channels collectively make up the music and effects signal 14.

It has been found that the language portion of any given audio signal does not occupy a large bandwidth. For example, a complete audio signal will typically occupy a signal range from 0-20,000 Hz. However, the language portion will usually occupy only a 4 kHz portion of that total signal bandwidth. The rest of the bandwidth is occupied by other sounds such as music, background noises, and the like.

As noted above, the language portion of the audio signal has a relatively narrow bandwidth. The audio/video system of the present invention takes advantage of the narrow bandwidth of the language portion of the audio signal to combine the audio information on the auxiliary language tracks 15 with the video signal. The music and effects channel 14 contains all of the remaining audio information that would normally accompany the video signal.

The language portion of the audio signal is input through the auxiliary audio channels 15. In the preferred embodiment there are twelve such channels. In the preferred embodiment, these signals correspond to the left and right stereo channels of complete audio signal for six different languages. While the preferred embodiment inputs multiple language tracks in stereo through the auxiliary channels 15, it will be understood by those skilled in the art that other information can be provided through these channels without departing from the overall scope of the present invention. For example, there may be twelve monaural language signals or some combination of stereo and monaural signals. Alternatively, the auxiliary channels may be used to transmit other types of information through the video format of the present invention. All of the auxiliary audio channels in the preferred embodiment are timed to be in synchronization with the video portion of the NTSC signal. It will be apparent to those skilled in the art that this synchronization is not required. Depending on the type of information which is being transmitted, the synchronization may or may not be desirable. In the preferred embodiment, the synchronization is accomplished by ensuring that the input video signal and the auxiliary channels are in synchronization as they are being input to the encoder. It will be apparent to those skilled in the art that various time delay features could be built into the encoder so that the input signals do not need to be in exact synchronization when they are input. The nature and structure of these time delay features will be apparent to those skilled in the art from reading the following description of the encoder element.

The encoder element 10 combines the input video signal 13 with the auxiliary audio channels to form an encoded video signal 16 which is NTSC compatible. (For commercial reasons it is desirable that all video signals be compatible with a particular standard. This allows the signal to be used in conjunction with existing video equipment. A standardized signal obviates the need to purchase specialized equipment.) The combination of the audio and video signals is accomplished by "overwriting" the language tracks from the auxiliary channels 15 onto preselected portions of the input video signal 13. The music and effects audio signal 14 is simply passed through the encoder element 10 without any substantial change. All of the signals are then output by the encoder element 10. The structure and operation of the encoder element 10 is described in more detail below with respect to FIG. 2.

The output of the encoder element 10 is passed to an audio video signal communication means 11 as shown in FIG. 1. The function of the signal communication means 11 is to transfer the encoded video signal 16 and the music and effects audio signal 14 from the encoder element 10 to the decoder element 12. Additionally, the signal communication means may store the signals for use at a later time. In the preferred embodiment, the signal communication means 11 is a standard video cassette recorder ("VCR"). The VCR allows the output of the encoder element 10 to be recorded for playback at any desired time. It will be apparent to those skilled in the art, however, that many other devices can be used with equivalent results. For example, the signal communication means may simply comprise a fiber optic transmission cable or microwave transmitter for transmitting the signals in real time to a distant location. Alternatively, the content of the audio and video signals may be digitized and stored in a binary computer memory for reproduction at a later date. These and other equivalent means may be substituted for the VCR, as will be apparent to those skilled in the art.

Referring again to FIG. 1, the present invention also includes a decoder element 12. The function of the decoder element is to transform the encoded video signal 16 into a signal which allows the information contained on any or all of the auxiliary audio channels 15 to be played in conjunction with the input video signal 13. As noted above, the decoder element 12 accepts the audio and video signals from the signal communication means 11. The decoder element 12 then removes the language tracks from the encoded video signal 16. The decoder element 12 duplicates the music and effects signal 14. Each of the language tracks are combined with a reproduction of the music and effects signal 14 so as to form a number of composite audio signals 18. These combined audio signals 18 are high bandwidth signals. They are output by the decoder element for eventual use by a user. The structure and operation of the decoder element is described in more detail below with respect to FIG. 3.

Figure 2:
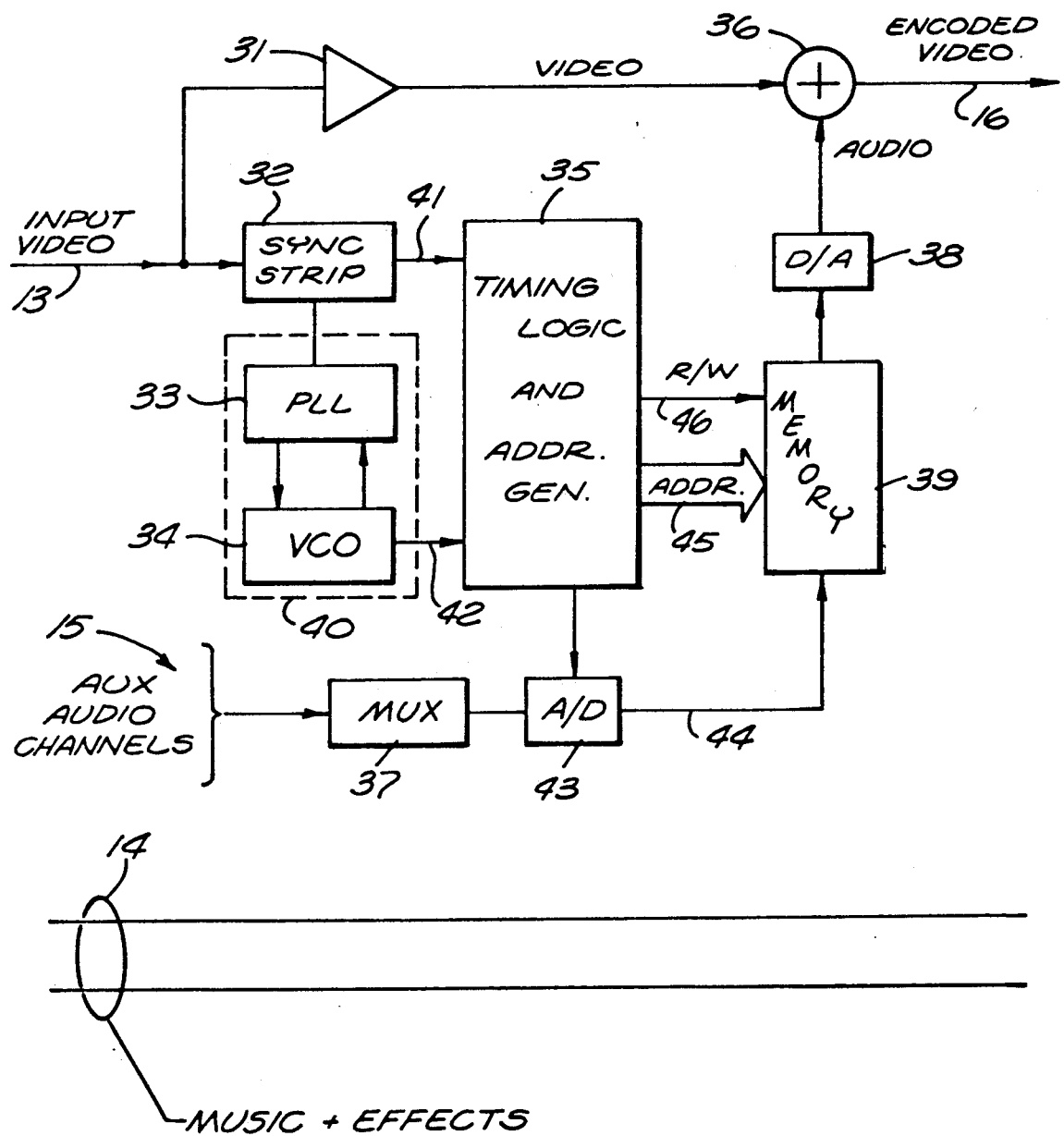
FIG. 2 is a block diagram of the encoder element of the present invention.

Referring next to FIG. 2, a block diagram of the encoder element 10 is shown. As discussed above, the encoder element 10 accepts three separate groups of input signals. These are the input video signal 13, the auxiliary audio channels 15, and the music and effects channel 14. As shown in FIG. 2, the music and effects signal is passed through the encoder without any substantial change. The video signal 13 is divided into two components. The first component passes through amplifier 31. The second component enters element 32. Element 32 is termed a synchronization stripper in the preferred embodiment because it separates the syncrhonization (timing) pulses from the video signal. These timing signals are used to direct the horizontal and vertical retrace functions of the electron beam as was described above. The output of the synchronization stripper 32 is used to generate a system clock 40 for the encoder element 10. The system clock is made up of the phase locked loop 33 ("PLL") and the voltage controlled oscillator 34 ("VCO"). The operation of the PLO/VCO combination is well-known to those skilled in the art and the operation of the clock 40 will therefore not be described in detail herein. It is only necessary that the clock generate a series of timing pulses at a desired frequency rate. The output of the synchronization stripper 32 is transferred via signal line 41 to the timing logic and address generator means 35. The output of the clock 40 is also applied to the timing means 35 over signal line 42. The timing logic and address generator means 35 uses these two signals to control the operation of the digitial memory 39 as will be described more fully below.

The timing logic and address generator means 35 controls the overall operation of the encoder 10. It is chosen from any one of a number of suitable devices which have the capability to control the operation of several digitial components simultaneously. In the preferred embodiment, the timing logic means 35 is a custom made programmable gate array ("PGA"). The PGA is chosen for the preferred embodiment because it allows high speed operation with a low manufacturing cost. It will be apparent to those skilled in the art that other, equivalent, devices can be used with equal effectiveness. For example, a digital microcomputer could replace the PGA and still effectively control the encoder 12.

The auxiliary audio channels 15 are input in a parallel fashion to the multiplexer 37. The multiplexer 37 is essentially a digital switch. It uses time division multiplexing techniques in order to sequentially sample each of the auxiliary audio channels. It is well known to those skilled in the art that a minimum sampling rate will allow each of the auxiliary audio channels to be multiplexed onto a single line without the loss of any of the information contained therein. This minimum sampling rate is known as the "Nyquist" rate. For any given analog signal the Nyquist rate is equal to twice the bandwidth of the signal. As noted above, the auxiliary audio channels will—in the preferred embodiment—contain language information. These signals typically have a bandwidth of approximately 4 kHz. Therefore, the Nyquist sampling rate for these signals is 8 kHz. It has been found that the construction of filters and other electric components is simplified when the sampling frequency of the signal which is being processed is increased. Therefore, in the preferred embodiment of the present invention, the auxiliary audio channels 15 are sampled by the multiplexer 37 at a frequency rate of 15.75 kHz. It will be apparent to those skilled in the art that this particular frequency is an arbitrary design choice and that other frequencies can be used with equal effectiveness. The timing details of the sampling rate are controlled by appropriate clock pulses generated by the timing logic and address generator means 35.

After the audio channels are sampled, they are converted to a digital format by the analog to digital converter 43. This type of analog to digital converter is well known to those skilled in the art and will not be described in detail herein.

The output of the analog to digital converter 43 is transferred over signal line 44 and stored in digital memory 39. Digital memory 39 is partitioned into a number of sections. (Those partitions are not necessarily physical in nature, but instead refer to the fact that the memory stores several discrete groups of data.) The number of partitions is equal to the number of auxiliary audio channels 15 which are input into the encoder 10. Thus, in the preferred embodiment of the invention, there are 12 separate partitions of the memory 39. The input stream from each auxiliary audio channel is sequentially stored within its corresponding partition of the memory 39. The timing logic and address generator means 35 generates an address signal over address lines 45 which instructs the memory where to store each bit of information from analog to digital converter 43. Timing is controlled by the timing signals generated by the system clock 40 over signal line 42. It is the information in memory 39 which is combined with the input video signal 13 so as to form the encoded video signal 16.

The present invention encodes the audio information onto the video signal by selecting a portion of the video signal which corresponds to certain scan lines on the video display and replacing the existing video information with desired audio information. In this description, when information is described as being written onto (or read from) a given scan line, it is to be understood that the audio is being combined with (or being removed form) that portion of the video component of the signal formal which corresponds to the particular scan line in question. The information is not actually "written onto" a scan line; it is simply inserted into the video signal at the proper time.

In the preferred embodiment of the invention, a preselected number of scan lines located at the top portion of the video pictures are used to store audio information. These specific lines are chosen for a variety of reasons. Most importantly, when the video signal is displayed, these lines cannot be seen by a user. Thus, there will be no loss of picture quality and the user will not notice that the audio information has been encoded onto the video signal. Of course, any of the other scan lines can be used to store the audio information. In particular, the bottom scan lines can be used because they too are not seen by the user when the picture is displayed.

In the preferred embodiment of the invention, one entire scan line is dedicated to each separate auxiliary audio channel. Thus, in the preferred embodiment of the invention, the portion of the video signal corresponding to the top 12 lines of the video picture are encoded with audio information.

The operation of the actual encoding process is as follows. After the electron beam executes a vertical retrace it will begin to scan the first line of the video signal. The synchronization stripper 32 separates the vertical retrace signal from the overall video component and transmits it to the timing logic means 35 over signal line 41. The timing means 35 will recognize the vertical retrace signal and instruct the memory 39 to output the desired information for the first auxiliary audio channel. To do so, it sends a signal over read/write line 46 instructing the memory to write data, and transmits the proper address for the initial location in the first partition of the memory over address line 45. Memory 39 then outputs (in proper sequential format) the information which had been previously stored for a first auxiliary audio channel.

The digital information from memory 39 is transmitted to digital to analog converter 38 where it is converted back into an analog signal. This analog signal is then passed to combiner 36 which writes the audio information on top of the existing video signal. In this way, the audio information replaces the existing video signal.

While the memory 39 is writing the data for the first scan line, the electron beam is travelling across the scan line. As the electron beam reaches the end of the scan line, a timing pulse in the video signal 13 will cause it to execute a horizontal retrace function. The synchronization stripper 32 separates the horizontal retrace pulse from the video signal and transmits it to the timing logic means over signal line 41. The timing logic means recognizes the horizontal retrace pulse and instructs the memory to cease writing the information for the first auxiliary channel and to start writing the information for the second audio channel. As the electron beam drops down one line and begins to scan the second horizontal scan line, the memory will output the information stored in the partition of the memory corresponding to the second audio channel. The writing of data is accomplished as described above. This process repeats for each of the auxiliary audio channels. The timing logic and address generation means 35 will count the number of horizontal retraces that are executed. After the twelfth horizontal retrace (in the preferred embodiment) the digital memory 39 will cease outputting data and will simply record the information from analog to digital converter 43 in the appropriate partition of the memory.

As noted above, the present invention allows the audio channels to be fully synchronized with the video signal. This contemplates that a separate real time audio signal will be input over each of the auxiliary audio channels 15. The input of this information will of course continue even though the information contained in that audio signal is not being written to its corresponding horizontal scan line on the video signal at any given time. In order to achieve the synchronization capability, the data is transferred out of memory at a rate much higher than the rate at which it is stored. Thus, the audio information for a particular auxiliary audio channel is stored into the memory while the electron beam is scanning the remainder of the video screen. It is only during the time that the electron beam traces the horizontal scan line corresponding to the auxiliary audio channel that the information is read from the memory and placed onto the video signal.

Because there a large number of horizontal scan lines on a standard video picture (262½ in the preferred embodiment), the audio information is transferred out of the memory in high speed bursts at a rate greater than that at which it is read into the memory. This effectively establishes a data compression scheme which allows all of the audio information for each auxiliary audio channel to be placed onto the video signal without any loss of information.

Figure 3:
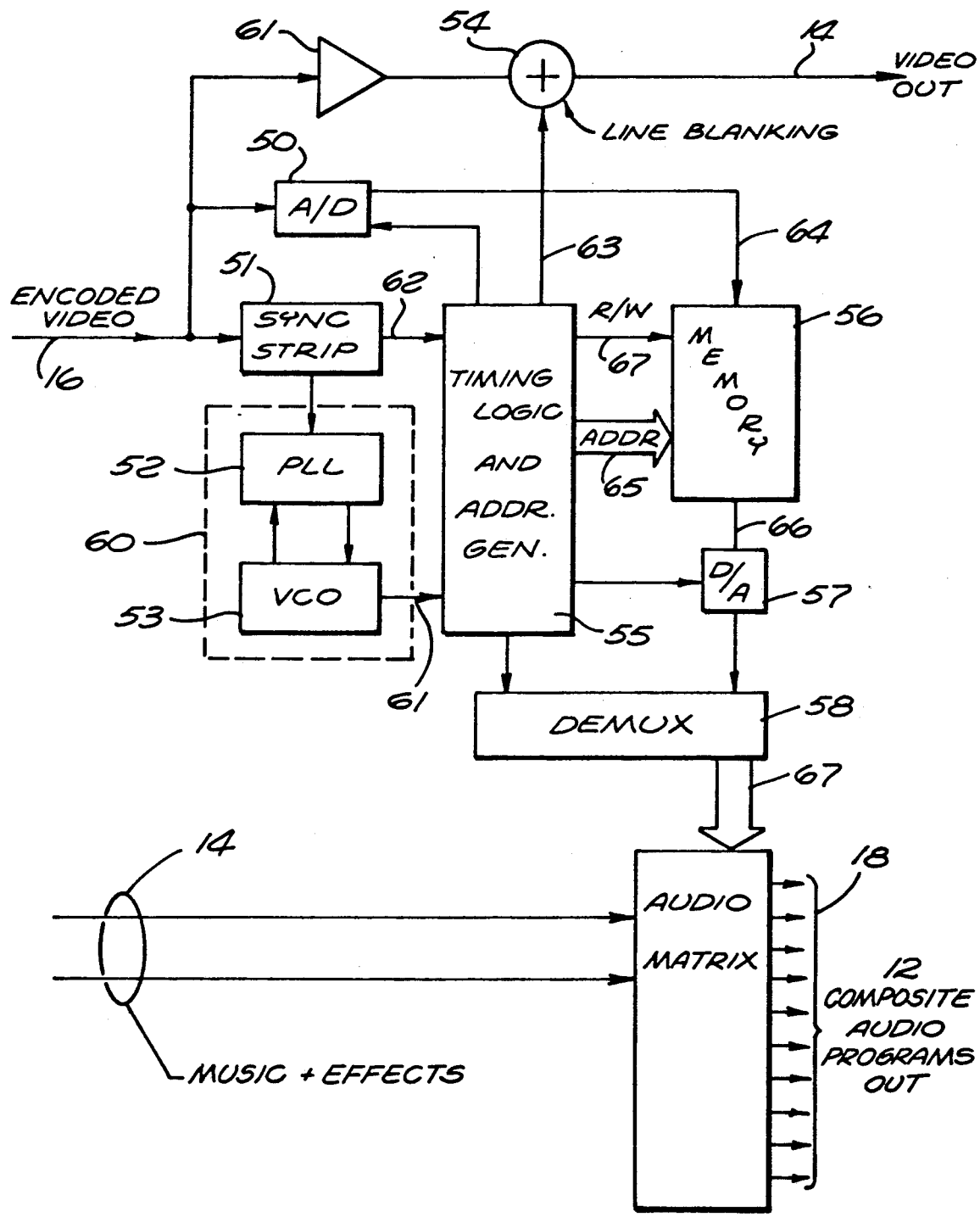
FIG. 3 is a block diagram of the decoder element of the present invention.

Referring next to FIG. 3, a block view of the components of the decoder element 12 is shown. The decoder element 12 accepts the encoded video signal 16 from the signal communication means 11 (not shown in FIG. 3). The encoded video signal is split into 3 components. The first component is applied to amplifier 61. The second component is applied to analog to digital converter 50 and the third component is applied to element 51.

As with the encoder element 10, the element 51 is termed a synchronization stripper because it separates the synchronization (timing) pulses from the video signal. A PLL 52/VCO 53 combination acts as a system clock 60. This system clock is similar in operation to the system clock of the encoder element and a description of its operation will not be repeated here. The system clock provides a series of timing pulses at the desired frequency to the timing logic and address generator means 55.

As noted above, the first component of the encoded video signal is transmitted to amplifier 61. The encoded signal passes through the amplifier and reaches component 54. Component 54 is a line blanking means. The line blanking means is used to insert a null signal into those portions of the video signal where the audio information had been overwritten by the encoder 10. When the video picture is displayed, this portion of the signal will appear to be a blank (black) line. The line blanking element only inserts a null signal to those particular scan lines which correspond to the auxiliary audio tracks 15. The timing logic means 35 is used to control the operation of the line blanking means 54. The timing and logic means 55 counts horizontal retrace signals in the encoded video signal and outputs a control signal over signal line 63 at the appropriate times.

The output of the line blanking means 54 is the unencoded video signal 14. This video signal is output to a user and can be viewed by any compatible video equipment. The unencoded video signal 14 is identical to the input video signal 13 with the exception that the top twelve scan lines (in the preferred embodiment) will now appear to be black to a viewer. As explained above, however, these blank lines do not present a serious problem, because they are normally "lost" in the display process.

The remaining structure of the decoder element 11 is directed towards removing the audio information from the encoded video signal and combining it with the music and effects signal 14 so as to form a complete audio signal. As noted above, one component of the video signal is applied to analog to digital converter 50. The function of the analog to digital converter 50 is to convert the audio information which is encoded onto the video signal into a digital format. Because the encoded audio information is only present on the uppermost scan lines, this element does not operate continuously. Analog to digital converter 50 is normally turned off and does not transmit information. It is turned on by the timing means 55 only when the portion of the video signal corresponding to the appropriate scan lines is being input to the decoder.

The timing logic and address generator means 55 is similar in operation and construction to the timing logic and address generator means 35 which is present in the encoder element. Thus, in the preferred embodiment it is a PGA. Of course, other equivalent devices can be substituted, as was described with respect to the encoder. The programming of the timing means 55 will be slightly different for the decoder than for the encoder. However, the specific details are well understood by those skilled in the art. The timing means 55 counts horizontal and vertical retrace signals which are present in the video signal and uses them as the basis of operation for its controller functions. Thus, after the electron beam executes a vertical retrace function, the timing means turns on the analog to digital converter 50. The analog to digital converter remains on until the electron beam has scanned twelve (in the preferred embodiment) complete lines. At that time the timing means 55 will send a signal to the analog to digital converter, instruction it to turn off.

The output of the digital to analog converter 50 is transferred over signal line 64 to the digital memory 56. Like the memory 39 in the encoder, memory 56 is divided into a number of partitions. The number of partitions is equal to the number of auxiliary audio channels 15—in the preferred embodiment twelve. As the digital audio information in input over signal line 64 it is sequentially stored in the appropriate partition of the memory 56. The operation of the read and write functions of the memory is controlled by signals from the timing means transmitted over read/write line 67. The timing logic and address generator means also transmits the appropriate address locations for where the data is to be written to, or read from, over data bus 65.

The audio information is written into the memory at a high rate of speed and is read therefrom relatively slowly. This is, of course, directly opposite to the operation of the encoder. Such symmetry would be expected because the decoder 12 is unpacking the audio information which was compressed by the encoder 10. The output of the memory is passed over signal line 66 to digital to analog converter 57. Digital to analog converter converts the audio information back into an analog format. From there it is passed to the demultiplexer 58.

Demultiplexer 58 converts the serial output stream from the digital to analog converter 57 and memory 56 onto a group of serial output signals. These output signals are substantially identical to the auxiliary audio channels 15 which were input to the encoder 15. Thus, at this point the decoder element 12 has succeeded in separating the auxiliary audio channels from the encoded video signal. Since the auxiliary audio signals are not a complete audio signal, however, the reconstruction of the audio signal is not complete. The digital to analog connector 58 therefore transmits the auxiliary audio channels in parallel format over the audio bus 68 to the audio matrix 59.

The function of the audio matrix 59 is to combine the auxiliary audio channels with the music and effects signal 14 so as to form a plurality of composite audio signals 18. Because these signals contain all of the information in the audio signal, they are high bandwidth signals. A user may then listen to any one of these complete audio signals while viewing the output video signal 14. The operation of the audio matrix will first be described in conjunction with the preferred embodiment.

In the preferred embodiment the twelve auxiliary audio channels correspond to the left and right channels for six different languages. The music and effects signal is therefore reproduced six times by the audio matrix 59—once for each language. The left channel of the first language is combined with the left channel of the music and effects signal. The right channel of the first language is combined with the right channel of the music and effects signal. This forms a complete stereo signal for the first language. The process is repeated for languages two through six. In this way six pairs of composite audio programs 18 are formed. Each pair of composite audio signal 18 in the preferred embodiment will necessarily be slightly different from each other.

It will be apparent to those skilled in the art that various different structures for the audio matrix 59 may be employed, depending on the type of information encoded onto the video signal and the desired output format. For example, auxiliary audio channels may not contain stereo information, but may be recorded in monaural instead. Obviously in such a case there will be no need to form complete stereo signals with the music and effects signal 14. As noted above, the auxiliary audio channels may input digital, numeric, information to be encoded onto the video signal. In that case it may not be desirable to combine the music and effects signal 14 with each of the auxiliary channels. The audio matrix 59 may then be constructed to provide such a signal directly to the user. These and other modifications to the audio matrix will be appreciated by those skilled in the art.

The audio programs in the preferred embodiment are designed to be in complete synchronization with the video portion of the signal. Therefore all of the duplication and combination functions of the audio matrix are performed in real time. The exact structure of the audio matrix is not described in detail here. However its construction is relatively straightforward and will be known to those skilled in the art. The structure of the audio matrix may include a resistor network to duplicate and combine the audio signals. Transistors may be used to amplify signal levels as required. The audio matrix 59 may be constructed as some form of custom integrated circuit.

Figure 4:
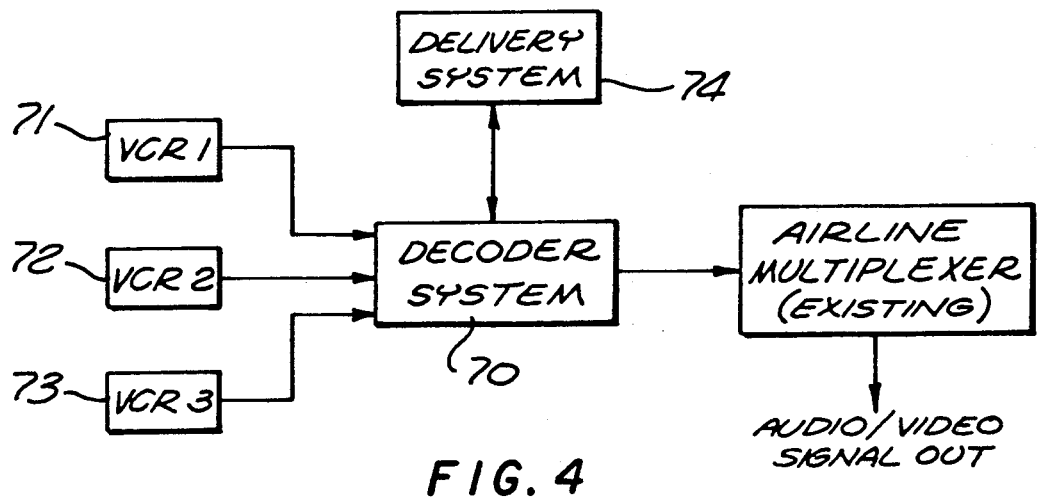
FIG. 4 is a block diagram of the preferred embodiment of the delivery system of the present invention in conjunction with the decoder element.

The output of the decoder 12 is fed into the delivery system 70. Although the delivery system 70 is not illustrated in FIG. 1, the structure of the preferred embodiment is shown in FIG. 4. The function of the delivery system is to allow a user to select any one (or more) of the composite audio signals 18 for use while viewing the picture generated by the video signal 14. This feature is important because a user will most often not want to listen to all of the audio channels at the same time. For example, the present invention may be used in an educational setting to teach different languages. The user may wish to view a portion of the video signal while listening to language number one (for example, the user's native language). Then the user may switch to language number two (for example, the language the user is learning) and re-view the same portion of the video signal. The delivery system will allow the user to switch between any of the composite audio signals 18 as desired. As a practical matter, the structure of the delivery system will be a function of the particular application for which the present invention is used.

One of the primary applications of the present invention—and the current preferred embodiment—is for use in commercial airliners. Quite often airlines will show movies for viewing by their passengers during the course of a lengthy flight. Many times the passengers will come from different countries and speak different languages. This is especially true in the case of international and overseas travel. The preferred embodiment of the delivery system therefore allows passengers on commercial airliners to chose the language that they wish to hear while viewing a movie.

Referring next to FIG. 4, the preferred embodiment of the delivery system is shown in conjunction with the decoder element 12, as would be applied in the setting of a commercial airliner. In this version, there are three separate decoder elements 12 located within decoder system 70. The outputs of three separate VCRs 71, 72, 73 are each separately applied to one of the decoder elements in the decoder system 70. The VCRs correspond to the signal communication means 11 which was described above with reference to FIG. 1. Although these specific inputs to the decoder system are described, it would be apparent to those skilled in the art that a different number of VCRs, or a different type of signal communication means 11, may be used without departing from the scope of the present invention. The decoder system 70 decodes the encoded video signal from each one of the VCRs as was described above with reference to FIG. 3. This will result in three separate restored video signals 16 each with its corresponding plurality of audio signals with multiple languages. In addition to the problems previously stated, the existing electrical systems of commercial airliners simply cannot accommodate such a large number of audio inputs for use in conjunction with the video programming. Delivery system 74 is therefore provided to control the output of the decoder system 70.

Delivery system 74 is, in the preferred embodiment, a microprocessor controlled audio switch for selecting one or more of the audio channels to be played in conjunction with the video program for each VCR. The selection means 74 is an audio matrix which controls the output of the decoder system 70. In the preferred embodiment, the output of the decoder system is multiplexed and applied to an existing multiplexer (not shown in FIG. 4) which controls the distribution of audio signals within the aircraft. This existing multiplexer controls the distribution of the audio signals to the specific seat locations within the aircraft. Its structure is well known to those in the art, and will not be described in detail here. It is sufficient to state that the aircraft is divided into a number of "zones" and that the Delivery System 74 allows one or more of the audio signals to be played in each of the zones.

Because the multiplexer already exists on the airplane, it is desired to ensure that the output of the decoder system is structured in a format that can be readily accepted by the multiplexer. This eliminates the need to install special wiring or other features within the aircraft so as to allow the use of the present invention.

As noted above, the selection means 74 is a microprocessor controlled audio switch. In the preferred embodiment, the delivery system also includes a selection means which allows the user to control the audio programs which are to be played. This selection means is an integral part of the delivery system 72, and can be a key pad, video screen, liquid crystal display, or the like. The exact details are not important. All that is required is that a user be able to select the desired language tracks which are to be played with a particular video program.

Although a specific preferred embodiment for the delivery system has been described, it will be apparent to those skilled in the art that different embodiments may be used for different situations. For example, it is contemplated that the present invention may be used in hotels. In that case a user may be able to select any of the languages which are encoded into the video signal as well as which video program is to be played.

Figure 5:
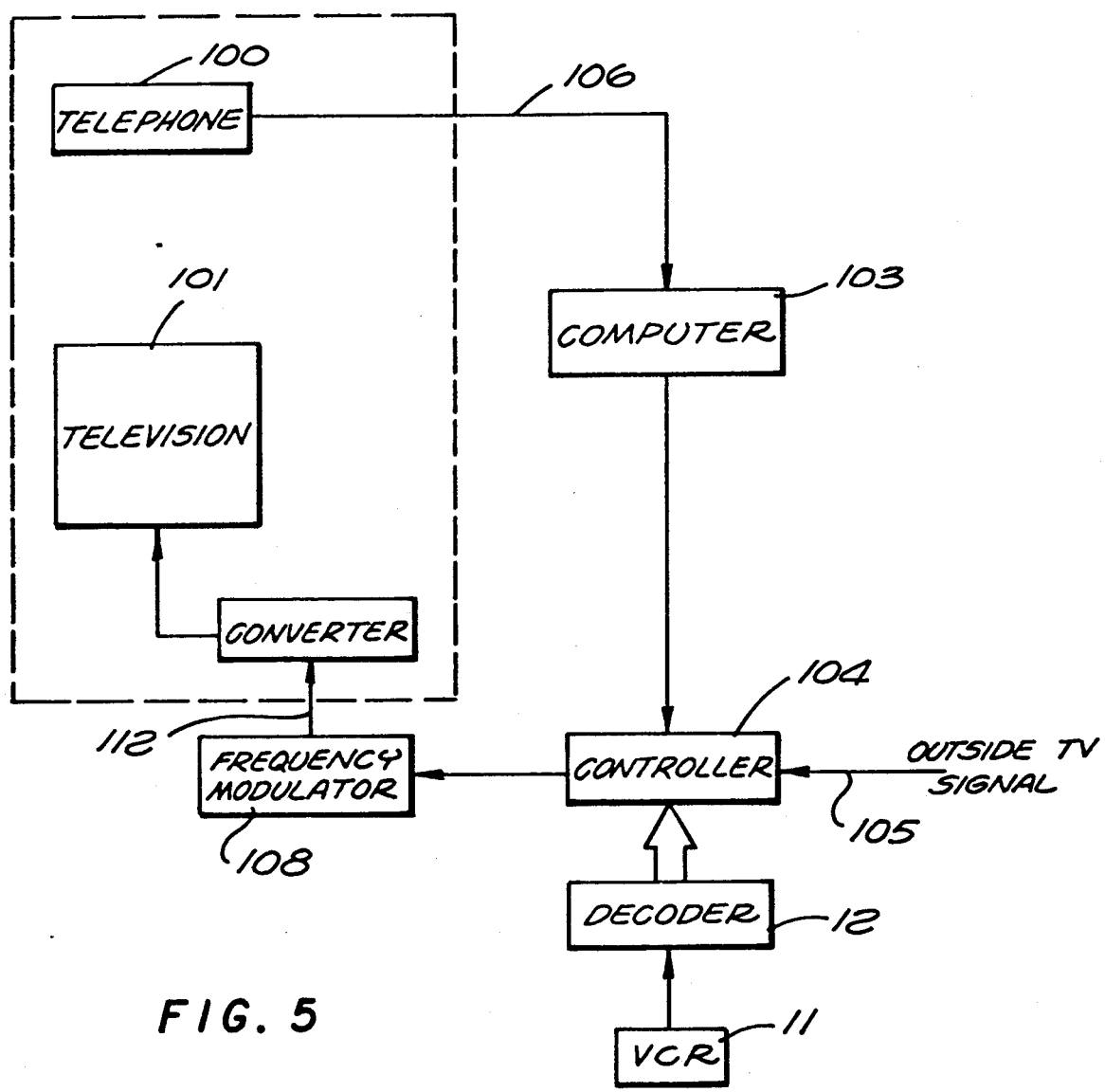
FIG. 5 is a block diagram of an alternative embodiment of the delivery system.

Referring next to FIG. 5, an alternate embodiment of the delivery system of the present invention is shown. This embodiment is particularly adapted to be used in connection with delivering multi-language television programs to hotel rooms and is anticipated to be used for that purpose. In this embodiment, it is anticipated that each individual guest room within a hotel will have a television which allows a guest to view television programs. Quite often, the guest will desire to view the television program in a particular language. Utilizing the present invention allows the guest to select any one of a number of languages in which to view the particular program. This embodiment of the delivery system allows the user to select any one of the number of languages with which to view a particular program.

With this embodiment of the delivery system, there are three components located within the hotel room itself. The delivery system also includes the selector means 100, the television 101 and a converter 102. There are additional components which are common to all of the rooms within the hotel. These are the computer 103, controller 104, decoder 12, and VCR 11. VCR 11 is the signal communication means which was described above in reference to FIG. 1. The decoder 12 is, of course, the same decoder which was described above with reference to FIG. 3. The VCR and decoder combination work as described above and output a plurality of combined audio signals for the given video program. These signals are output to the controller 104.

Whenever a user desires to view a video program with a particular language, he simply chooses the desired language through the use of the selector means 100. It is anticipated that the selector means can take the form of any one of a number of embodiments. For example, the selector means may be in the hotel rooms push-button telephone. A connection between the selector means 100 and the computer 103 is made over signal line 106. In this version, the user would simply dial an appropriate number over the telephone which would be sent to the computer 103. Computer 103 will recognize the tones generated by the telephone as indicating a particular language which is to be listened to in conjunction with the video program. Other embodiments of the selector means 100 are possible. For example, the selector means 100 may simply be a hard wired series of push buttons where, by pressing a particular button, the appropriate language is chosen. Computer 103 responds to the signal generated by the selection means and determines which language the user wishes to hear. Micro computer 103 then generates an appropriate signal which is sent to controller 104.

The function of the controller 104 is to combine all of the combined audio/video signals from the decoder 12 onto a single cable. In addition, the controller 104 may also add additional video signals into the signal. For example, the controller may combine an outside TV signal which is shown entering the controller over the signal line 105. Controller 104 accomplishes its task by modulating the input audio and video signals onto a particular frequency. Thus, each audio/video signal will be assigned a separate frequency. The controller also adds the signal which was generated by the computer 103 to identify the desired language into the video signal.

Controller 104 is coupled to frequency modulator 108. Frequency modulator 108 actually converts the signals supplied by the controller into the proper frequency range. The output of the frequency modulator is a single signal. However, this signal contains all of the information necessary to reproduce the video signal in conjuction with any one of the pre-recorded languages. This signal is fed over signal line 112 to the converter 102. The converter 102 functions much like a radio tuner. Converter 102 accepts the control signal which was output by the computer 103 and added to the video signal by the controller 104. This enables the converter 102 to identify which language signal is to be passed to the television 101.

In its normal operation, converter 102 blocks all signals from entering the television. However, once a proper control signal is generated by the controller 104, the converter 102 will then allow the signal to be passed through to television. In this manner, a user can choose any one of the pre-recorded languages to be viewed in conjuction with the pre-recorded video program.

The foregoing has described a system for encoding an audio/video signal with multi-language capability. This description has been made with reference to specific exemplary embodiments thereof. It will be apparent to those skilled in the art that various modifications and changes can be made to these embodiments without departing from the overall spirit and scope of the invention. Some of these changes have been described. Others are possible. The preceeding description should therefore be considered illustrative rather than restrictive. The full extent of the present invention is limited only by the following claims.

What is claimed is:

1. An audio-video system for encoding and decoding a video signal and a plurality of corresponding audio signals, comprising:
    encoder means for receiving an input video signal, a first audio signal, and a plurality of second audio signals corresponding to said input video signal, said encoder means combining said input video signal and said plurality of second audio signals by replacing selected portions of said iput video signal with said plurality of said second audio signals to produce an encoded video signal but leaving said first audio signal substantially unchanged, said encoder means outputting said first video signal and said encoded video signal;
    audio-video signal communication means for receiving said first audio signal and said encoded video signal from said encoder means, said communiction means outputting said first audio signal and said encoded video signal in a predetermined manner; and
    decoder means coupled to said signal communication means for receiving said encoded video signal and said first audio signal, said decoder means separating said plruality of second audio signals from said encoded video signal so as to form an unencoded video signal and a plurality of second audio signals, and combining each of said plurality of second audio signals with a reproduction of said first audio signal so as to form a plurality of combined audio signals, said decoder means simultaneously outputting said unencoded video signal and said plurality of combined audio signals.

2. The system of claim 1, further comprising a signal delivery means coupled to said decoder means, said signal delivery means including a selection means such that at least one of said plurality of said combined audio signals may be played with said unencoded video signal.

3. The system of claim 1 wherein said video signal represents a video picture made up of a plurality of horizontal scan lines and said selected portions of said video signal correspond to a predetermined number of said scan lines.

4. The system of claim 3 wherein said scan lines are located at a top portion of said video picture.

5. The system of claim 3 wherein said predetermined number of scan lines are equal to the number of said second audio signals.

6. The system of claim 4 wherein said predetermined number is twelve.

7. The system of claim 5 wherein said portion of said video signal corresponding to a selected scan line exclusively stores information from one of said second audio signals.

8. The system of claim 1 wherein said first audio signal is a high bandwidth signal, and said plurality of second audio signals are low bandwidth signals.

9. The system of claim 1 wherein said encoder means comprises:
    input means for receiving said input video signal and said plurality of second audio signals;
    synchronization means responsive to said input video signal for sensing timing signals contained in said input video signal;
    audio signal linking means responsive to said plurality of second audio signals for converting said plurality of audio signals into a stream of information;
    data storage means operatively coupled to said audio signal linking means for storing said stream of information;
    timing means responsive to said synchronization means and in communication with said storage means, said timing means triggering a release of said stream of information from said storage means in discrete bursts of data responsive to said synchronization means; and video signal combining means coupled to said input means and said data storage means for combining said bursts of data into said imput video signal in a predetermined manner so as to form said encoded video signal, said combining means then outputting said encoded video signal.

10. The system of claim 9 wherein said synchronization means comprises a phase-locked loop.

11. The system of claim 10 wherein said phase-locked loop further includes a voltage controlled oscillator.

12. The system of claim 9 wherein said audio signal linking means comprises a time division multiplexer.

13. The video system of claim 12 wherein said audio signal linking means further comprises an analog-to-digital converter for converting said stream of information from the analog domain to the digital domain.

14. The system of claim 13 wherein said data storage means comprises a digital memory.

15. The system of claim 13 further comprising a digital-to-analog converter coupled between said data storage means and said video signal combining means for converting said bursts of data from the digital domain to the analog domain.

16. The system of claim 1 wherein said signal communication means further includes data storage means for storing said encoded video signal.

17. The system of claim 1 wherein said audio-video signal communication means comprises a video cassette player.

18. The system of claim 1 wherein said audio-video signal communication means comprises a satellite communication system.

19. The system of claim 1 wherein said audio-video signal communication means comprises a video disk player.

20. The system of claim 1 wherein said decoder means comprises:

input means for receiving said encoder video signal and said first audio signal, said encoder video signal having segments with said plurality of second audio signals encoded thereon;

timing means responsive to said encoder video signal for identifying said segments of said encoded video signal containing said plurality of second audio signals;

memory means coupled to said timing means and said input means for storing said segments of said encoded video signal containing said plurality of second audio signals;

audio signal separating means coupled to said memory means and responsive to said timing means for separating said plurality of audio signals;

audio signal combining means coupled to said audio signal separating means and said input means for receiving said separated audio signals and said first audio signal, said audio signal combining means combining a reproduction of said first audio signal with each of said plurality of second audio signals; and output means for outputting said audio signal and said plurality of combined audio signal.

21. The system of claim 19 further comprising line blanking means coupled to said timing means for encoding a null signal over said storage segments of said restored video signal prior to outputting said restored video signal.

22. The system of claim 20 wherein said audio signal separating means comprises a demultiplexer.

23. The system of claim 20 wherein said timing means includes a phase-locked loop.

24. A device for decoding an encoded video signal having segments with a plurality of audio signals encoded thereon, said apparatus comprising:

input means for receiving said encoded video signal and a music and effects audio signal;

timing means responsive to said encoded video signal for identifying said segments of said video signal containing said plurality of audio signals;

memory means coupled to said timing means and said input means for storing said segments of said encoded video signal containing said plurality of audio signals;

audio signal separating means coupled to said memory means and responsive to said timing means for separating said plurality of audio signals from said encoded video signal so as to form an unencoded video signal;

audio signal combining means coupled to said audio signal separating means and said input means for receiving said separated audio signals and said music and effects audio signal, said combining means combining said music and effects audio signal with each said plurality of audio signals; and output means for outputting said unencoded video signal and simultaneously outputting said plurality of combined audio signals such that a user may select from one or more of said plurality of combined audio signals.

25. The device of claim 24 further comprising line blanking means coupled to said timing means for writing a blank signal over said storage segments of said video signal prior to outputting said unencoded video signal.

26. The audio-video system of claim 25 wherein said audio signal separating means comprises a demultiplexer.

27. The device of claim 24 wherein said timing means includes a phase-locked loop.

* * * * *

UNITED STATES PATENT AND TRADEMARK OFFICE
CERTIFICATE OF CORRECTION

PATENT NO. : 5,130,815

DATED : July 14, 1992

INVENTOR(S) : Silverman et al.

It is certified that error appears in the above-identified patent and that said Letters Patent is hereby corrected as shown below:

In column 1 at line 59, please delete " mulitple " and insert -- multiple --.

In column 2 at line 14, please delete " firt "and insert -- first --.

In column 5 at line 37-38, please delete " syncrhonization " and insert -- synchronization --.

In column 5 at lines 56 and 62, please delete " digitial " and insert -- digital --.

In column 9 at line 49, please delete " in input " and insert -- is input --.

In column 13 at line 36, please delete " conjuction " and insert -- conjunction --.

In column 14, claim 1 at line 4, please delete " iput video signal " and insert -- input video --.

In column 14, claim 1 at line 8, please delete " video " and insert -- audio --.

In column 14, claim 1 at line 12, please delete " communiction " and insert -- communication --.

In column 14, claim 1 at line 19, please delete " plruality " and insert -- plurality --.

UNITED STATES PATENT AND TRADEMARK OFFICE
CERTIFICATE OF CORRECTION

| | | |
|---|---|---|
| PATENT NO. | : 5,130,815 | |
| DATED | : July 14, 1992 | PAGE 2 OF 2 |
| INVENTOR(S) | : Silverman et al. | |

It is certified that error appears in the above-identified patent and that said Letters Patent is hereby corrected as shown below:

In column 14, claim 6 at line 43, please delete " 4 " and insert -- 3 --.

In column 15, claim 20 at lines 40-41, please delete " encoder " and insert -- encoded --.

In column 16, claim 20 at line 6, please delete " audio " and insert -- video --.

In column 16, claim 20 at line 7, please delete " signal " and insert -- signals --.

Signed and Sealed this

Fourth Day of November, 1997

*Attest:*

BRUCE LEHMAN

*Attesting Officer*       *Commissioner of Patents and Trademarks*